United States Patent [19]

Brown et al.

[11] 4,368,634
[45] Jan. 18, 1983

[54] EXTRUSION PUNCH AND METHOD OF CONSTRUCTION

[75] Inventors: Thomas A. Brown, Greensburg; Joseph B. Huber, Acme, both of Pa.

[73] Assignee: Kennametal Inc., Latrobe, Pa.

[21] Appl. No.: 183,723

[22] Filed: Sep. 3, 1980

Related U.S. Application Data

[63] Continuation of Ser. No. 644,642, Dec. 12, 1975, abandoned.

[51] Int. Cl.³ .......................... B21C 23/18; B21C 2600
[52] U.S. Cl. ......................................... 72/273; 72/267; 72/479; 403/381; 403/273; 403/299; 29/447
[58] Field of Search ................. 72/264, 266, 267, 478, 72/273, 479; 76/107 A, 107 R, DIG. 11; 285/381, 392, 329, 332, 422, 334.5, DIG. 24; 403/273, 343, 299, 381, 333, 334, 296, 404; 29/447, DIG. 35, 456, 526 R, 402.17

[56] References Cited

U.S. PATENT DOCUMENTS

| | | | |
|---|---|---|---|
| 781,422 | 1/1905 | Hayden et al. | 285/329 |
| 1,989,948 | 2/1935 | Singer | 72/264 |
| 2,955,847 | 10/1960 | McKenna | 285/392 X |
| 3,514,140 | 5/1970 | Ely et al. | 403/381 |
| 3,552,173 | 1/1971 | Biginelli | 72/267 |
| 3,561,242 | 2/1971 | Biginelli | 72/267 |
| 3,677,060 | 7/1972 | Loquist | 76/107 A |
| 3,698,749 | 10/1972 | Yonkers | 403/381 |

FOREIGN PATENT DOCUMENTS 1381702 11/1964 France ............................ 72/267

OTHER PUBLICATIONS

Machinery (May 1968) pp. 104–110, "Tool Design Tips for Cold Extrusion", Designing with kennametals, (1967) by Kennametal Inc.

Primary Examiner—Lowell A. Larson
Attorney, Agent, or Firm—Lawrence R. Burns; Ira D. Blecker

[57] ABSTRACT

An extrusion punch, especially for use in a back extrusion process, wherein a hard wear resistant material is joined on one end to a steel punch body. The hard wear resistant material is joined on at the tip of a steel body so as to prevent wear due to abrasion on the punch caused by the material being extruded in a die means. The hard wear resistant end cap on the tip of the steel body is joined so that it may easily and quickly be replaced when the punch is in position on the machine thereby providing less down time for maintenance on the extrusion press. The method of joining the hard wear resistant end cap to the steel body minimizes the conditions which tend to fracture hard wear resistant material.

3 Claims, 10 Drawing Figures

EXTRUSION PUNCH AND METHOD OF CONSTRUCTION

This is a continuation of application Ser. No. 644,642, filed Dec. 12, 1975 and now abandoned.

BACKGROUND OF THE INVENTION

In an extrusion press, a punch member and a die member are utilized such that material to be extruded is placed in a die member and an extrusion punch powdered on one end by a force transmitting mechanism is caused to enter the die means, and by compressing the material in the die means, the material flows under pressure into a desired end.

Specifically, in a back extrusion process, the die means is closed on the lower end, and there is sufficient clearance between the inside diameter of the die means and the outside diameter of the punch such that, when the material to be extruded is compressed, it flows axially into the clearance provided between the punch and the die means.

Most punches of the prior art have been formed of a hardened steel material in order to transmit the force required for deformation of the material to be extruded. A steel punch used in a back extrusion process usually has a uniform diameter throughout its length except for the end of the punch which first enters the die means, and this end is provided with a slightly larger diameter such that, when the material that is being extruded flows outward and around the enlarged end of the punch, it will not contact the outer surface of the punch which it surrounds. This is done so that the punch may be extracted from the die means without the extruded material being engaged to the punch.

The material that is extruded is sometimes extruded at an elevated temperature or has heat imparted to it from its mechanical deformation such that, if the extruded material were to stay with the punch as it was retracted from the die means, the immediate cooling of the extracted material would cause it to contract and serious problems would then arise in having to remove the extruded material from the punch before any further extruding would be possible.

One of the problems that arises when using a punch made of a steel material is that, after a certain period of use, the slightly enlarged diameter of the punch is severely galled or worn down due to abrasion of the material as it flows around corners of the punch. When that diameter is worn down, there is no clearance between the extruded material and the diameter of the rest of the punch body and the extrusion punch must then be removed and replaced in order to continue the extrusion operation.

It is an object of the present invention to provide a hard wear resistant material on the tip of the extrusion punch that will significantly outlast any of the steel materials presently used on such extrusion machines.

It is a further object of the present invention to make the hard wear resistant tip easily and quickly replaceable so as to minimize down time required for maintenance on the extrusion machine.

It is a further object of the present invention to join the hard wear resistant material to the already existing steel extrusion punch in such a manner so as to take advantage of the compressive strength of the hard wear resistant material.

BRIEF SUMMARY OF THE INVENTION

An extrusion or forming punch which is used for shaping material in the die means, especially in a back extrusion process, is provided with a hard wear resistant end cap to reduce the wear and prolong the useful life of the punch.

The hard wear resistant end cap is joined to the end of a cylindrical steel body so that the hard wear resistant material will come into contact with the material being extruded in the die. The end cap has a matching diameter with that of the cylindrical steel body and a central internal threaded means for connection of the end cap with the cylindrical steel body.

The end cap is abutted concentrically on the cylindrical steel body so that, when the extrusion is being accomplished, the hard wear resistant material is being held compressively between the steel body and the material. The face of the end cap which engages the material to be extruded has a slightly enlarged diameter over the diameter of the cylindrical steel body so that, when back extruding, the extruded material will not engage the side walls of the punch and stay with the punch as it is extracted from the extrusion die.

The method of attaching the hard wear resistant end cap takes into account that hard wear resistant materials are extremely strong in compression but relatively weak in tension. A reduced diameter portion extends from a face on the cylindrical end cap into a central hole formed along the axis in the cylindrical steel member.

A ring member of a threadable material is fitted over the reduced diameter portion of the hard wear resistant end cap and secured thereto by brazing the inside diameter of the ring member to the outside diameter of the reduced diameter portion. Threads are formed on the outside diameter of the ring and these are engaged with threads which have been formed in the central hole of the steel body so that the hard wear resistant end cap is firmly abutted to and concentrically located on the end of the cylindrical steel body.

The method of connecting the hard wear resistant end cap to the ring of threaded material comprises forming a reduced diameter portion tapering outwardly as it extends away from the face on the hard wear resistant end cap and the inside diameter of the threaded ring is formed so as to provide an interference fit with the tapering reduced diameter portion.

The ring and the reduced diameter portion are assembled by, first, heating the ring to an elevated temperature so that its inside diameter expands until it is slightly greater than the largest outside diameter portion of the reduced diameter on the end cap. The ring is then fitted down over the reduced diameter portion and the ring is then allowed to cool, causing the inside diameter of the ring to contract and securely grip the reduced diameter portion. The ring, in addition to the shrink fit, may also be brazed to the reduced diameter portion to provide an even more secure connection.

The exact nature of the present invention will become more clearly apparent upon reference to the following detailed specification taken in connection with the accompanying drawings in which.

DETAILED DESCRIPTION OF THE INVENTION

Figure 1:
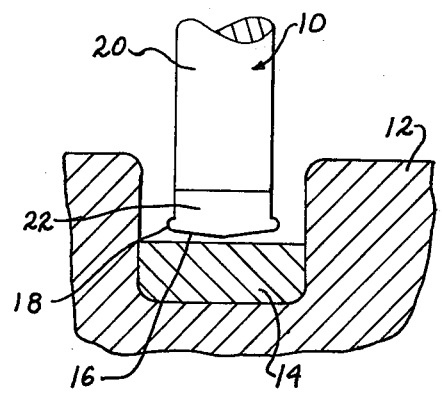
FIG. 1 is a side cut away view of an extrusion punch die means and material to be extruded.

Referring to the drawings somewhat more in detail, in FIG. 1 is shown an extrusion punch 10 shown entering a die means 12 which is about to engage and extrude material 14. Extrusion punch 10 is powered on one end by a force transmitting mechanism, not shown, such that face 16 will engage material 14 during the extrusion process. Extrusion punch 10 near the proximity of face 16 has an enlarged diameter portion 18 which is somewhat larger in diameter than the uniform diameter of extrusion punch 10.

Extrusion punch 10 is sometimes formed of two parts 20 and 22, both of which are of a metal material, usually steel material, and have a threaded internal connection joining parts 20 and 22 such that, when the enlarged diameter portion 18 near face 16 becomes worn, the lower part 22 of punch 10 may be removed and replaced by a new lower part 22.

Figure 2:
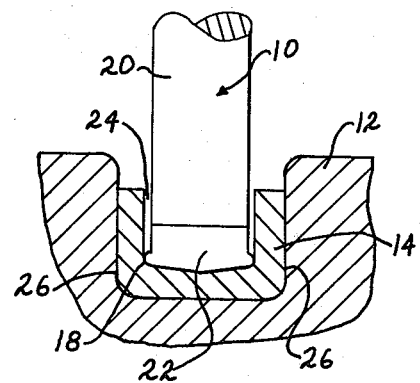
FIG. 2 is a side cut away view of a punch, die and extruded material.

Referring now to FIG. 2, what is shown is extrusion punch 10 at its most advanced position into die means 12 wherein the material 14 has been extruded and is now surrounding a substantial portion of the uniform diameter of extrusion punch 10. Enlarged diameter 18 has caused the material 14 to have an inside diameter which is greater than the outside diameter of extrusion punch 10 and thereby a clearance 24 is provided between material 14 and extrusion punch 10 so that material 14 will not engage or grip extrusion punch 10.

The frictional forces provided by walls 26 of the die means 12 are sufficient to hold material 14 in the die when extrusion punch 10 is removed due to the limited frictional engagement of the enlarged diameter 18 with the extruded material 14.

However, if the enlarged diameter 18 on extrusion punch 10 becomes worn from the abrasive flow of material 14 around its corners, the material 14 will begin to more and more engage the side surfaces of extrusion punch 10 and, at a certain point, the frictional engagement of the outside diameter of extrusion punch 10 with the extruded material 14 will overcome any frictional engagement between the die walls 26 of die means 12 and material 14 and the extruded material will come out attached to extrusion punch 10.

As can be seen in FIG. 2, and as will be understood once the enlarged diameter 18 has worn a predetermined amount, part 22 of extrusion punch 10 must be replaced and, further, there is no possibility of regrinding or refurbishing part 22 such that it may be used again in the same back extrusion process from which it was just removed.

Figure 3:
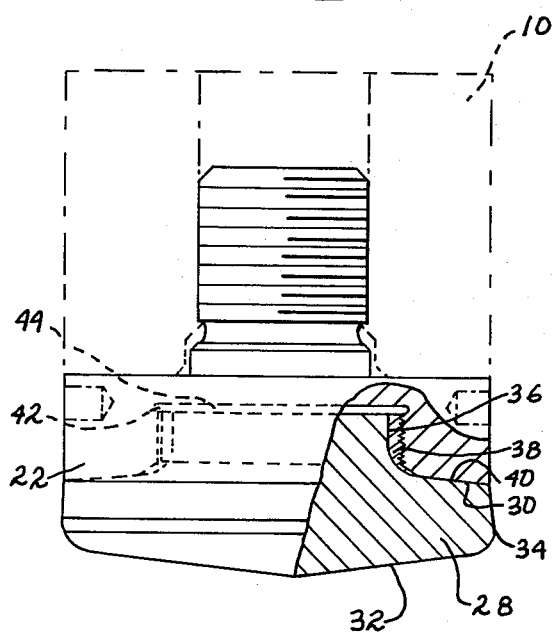
FIG. 3 is a side view, partially cut away, of an extrusion punch according to the present invention.

Referring now to FIG. 3, what is shown in FIG. 3 is the extrusion punch 10 which is in the form of a cylindrical steel body and on its lower end the modified part 22 has been engaged therewith. Part 22 now consists of a hard wear resistant end cap 28 which is also cylindrical and has a face 30 on one side of the end cap and a face 32 on the other side of the end cap. The diameter of end cap 28 near face 30 is substantially the same diameter as the extrusion punch 10 while, near face 32, there is an enlarged diameter 34 provided which would correspond with the earlier mentioned enlarged diameter portion 18 as shown in FIGS. 1 and 2.

The face 30 has a reduced diameter portion 36 which is of a smaller diameter than that of the extrusion punch 10 and the reduced diameter portion 36 extends away from face 30 on end cap 28. The reduced diameter portion may be of a uniform diameter as it extends away, but it is, preferably, tapered such that the diameter of 36 becomes larger as the distance it extends from surface 30 becomes greater.

A ring member 38 is formed out of a threadable material, preferably, in this case, the material is a heavy tungsten based alloy having a trade name of KENNERTIUM. The threadable ring 38 may be placed on the reduced diameter portion in any of the ways shown by FIGS. 6, 7 and 8 which are described later in this specification. The end cap 28 and the part 22 of cylindrical steel punch 10 have cooperating elements of abutment between them located on face 30 of end cap 28 and face 40 of part 22.

In FIG. 3, when end with ring member 38 is assembled, threads formed on the outside diameter of ring member 38 are engaged with threads formed in central hole 42 of part 22. The central hole 42 in part 22 is provided with a clearance 44 so that the reduced diameter portion of end cap 28 will freely enter central bore 42 and the threaded engagement between ring 38 and the threads on the central bore 42 will pull end cap 28 into firm and concentric abutment with face 40 of part 22.

It may be seen from FIG. 3 that, with the above arrangement, cylindrical punch 10 may stay attached to the extrusion press while part 22 is removed when enlarged diameter 34 has worn sufficiently and be immediately replaced by either part 28 or a combination of parts 22 and 28 as shown in FIG. 3.

Figure 4:
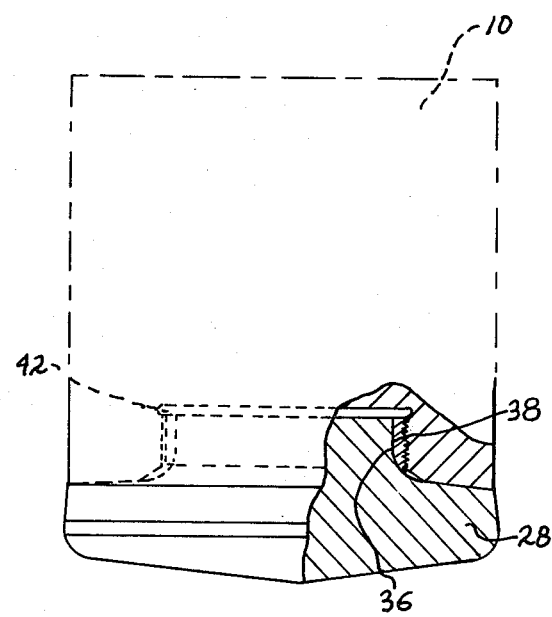
FIG. 4 is a side view, partially cut away, of a modification of an extrusion punch according to the present invention.

With reference to FIG. 4, what is shown therein is a modified version of what was shown in FIG. 3 with 10 being the cylindrical extrusion punch formed in one piece rather than having a separate piece 22 threaded on extrusion punch 10. End cap 28 is shown having ring member 38 assembled about the reduced diameter portion 36 and threaded into central bore 42 which has now been formed into the cylindrical extrusion punch 10.

Figure 5:
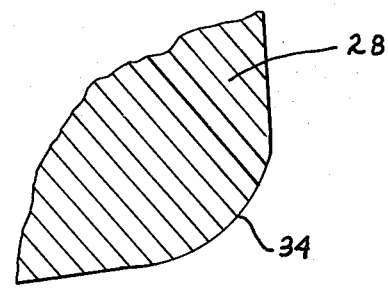
FIG. 5 is a typical corner configuration of the face of end caps.

Referring now to FIG. 5, enlarged diameter 34 on the corner of end cap 28 is shown in enlarged view merely to emphasize that enlarged diameter need only be a slight amount larger than the uniform diameter of the rest of the extrusion punch in order to provide the necessary clearance for the punch.

Figure 6:
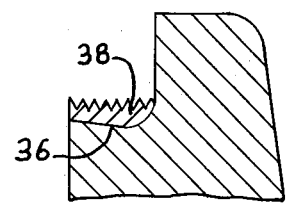
FIGS. 6, 7 and 8 illustrate examples of how a threaded ring is used to connect a hard wear resistant material to a cylindrical steel body.

Referring now to FIG. 6, what is shown herein is reduced diameter portion 36 having a ring member 38 assembled thereon. The ring member 38 is formed of a heavy tungsten metal alloy and has threads on its outside diameter and its inside diameter has been formed with a taper so as to match the taper of the reduced diameter portion 36. The taper as shown by FIG. 6 is, preferably, 5 to 7½ degrees and ring member 38 may be a split bushing comprising two or more pieces. When a split bushing is used, the different pieces of the split bushing would be brazed to the reduced diameter portion, and in the outside diameter of the composite ring 38, would be machined and threaded so as to engage the threads of the central bore 42.

Figure 7:
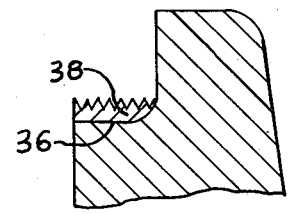

Referring now to FIG. 7, again, the reduced diameter portion 36 is shown with a ring member 38 assembled thereon. The reduced diameter portion 36 is tapered as is inside diameter of ring member 38, the tapering being, preferably, 0 degrees, 30 minutes as shown in FIG. 7.

In this particular case, ring member 38 is a solid ring, and the method of assembly is to elevate the temperature of ring member 38 until the smallest dimension of its inside diameter will fit over the largest diameter of the outside diameter of reduced diameter portion 36. Ring member 38 may then be fit over reduced diameter portion 36 and positioned thereon so that, upon cooling, ring member 38 will contract and provide an interference fit on reduced diameter portion 36.

Figure 8:
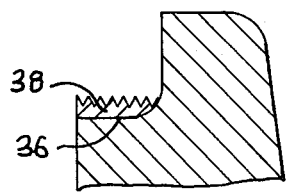

Referring now to FIG. 8, reduced diameter portion 36 is shown having a ring member 38 assembled thereon. However, reduced diameter portion 36 has a uniform diameter as it extends away from face 30 and ring member 38 has a correspondingly uniform inside diameter to provide a snug fit when assembled over reduced diameter portion 36. As shown in FIG. 8, the ring member 38 is brazed to reduced diameter portion 36 to hold it securely in place.

The design of the present invention is, of course, preferably utilized on large size extrusion or forming punches where the cost of producing the punch would be prohibitive.

Figure 9:
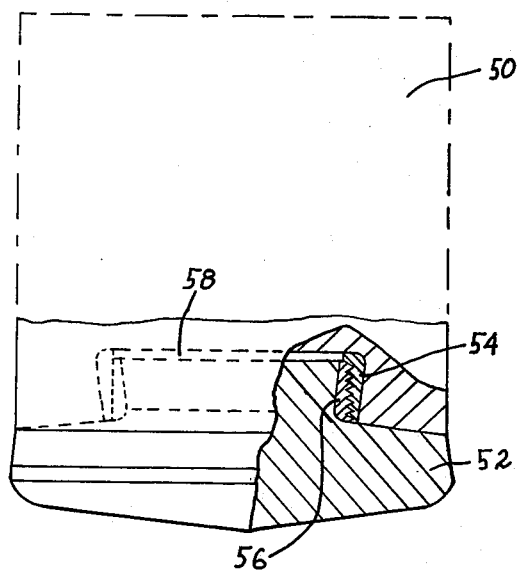
FIG. 9 illustrates an example of how to connect a hard wear resistant punch body to a hard wear resistant end cap.

Referring now to FIG. 9, what is shown therein is a rigid cylindrical body 50 which is comprised of a hard wear resistant material such as a cemented hard metal carbide. The end cap 52 also being comprised of a hard wear resistant material must be attached by using two rings 54 and 56 with the metal ring 54 being attached to the inside walls of a cavity 58 formed in rigid body 50. The ring 56 is attached to the reduced diameter portion of 52. It is to be understood that these rings may be affixed to their respective members be either brazing or forming an interference fit of one to the other.

Figure 10:
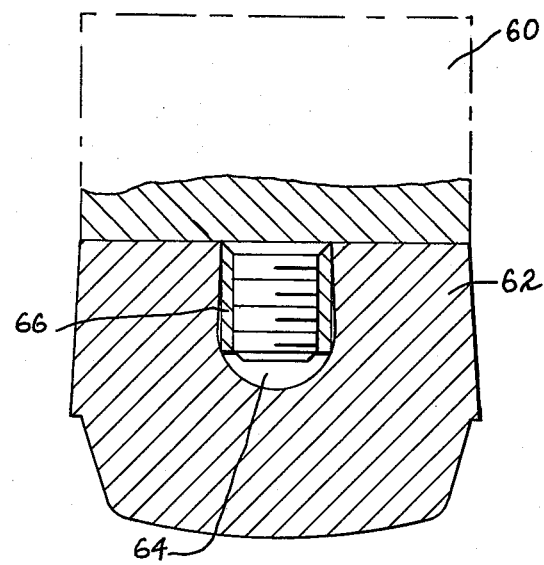
FIG. 10 illustrates another example of how to attach a hard wear resistant member to a punch member.

Referring now to FIG. 10, what is shown therein is another rigid punch body 60, but in this particular case, the end cap 62 is furnished with a central cavity 64 so that it may receive a metal ring member 66 therein. The inside diameter of metal ring 66 has threads formed therealong so that it may receive a reduced diameter portion which extends from rigid body 60. The metal ring 66 may fit into cavity 64 and form an interference fit therewith or may also be brazed in place.

In the case where ring 66 forms an interference fit with cavity 64, the method that is, of course, used is to heat end cap 62 to an elevated temperature so that the diameter of the mouth of cavity 64 expands a sufficient amount to allow ring 66 to be placed therein. When ring 66 has been placed in cavity 64, the entire assembly is allowed to cool and ring 66 is then firmly held in cavity 64.

Modifications may be made within the scope of the appended claims.

What is claimed is:

1. An extrusion or forming punch for shaping material in a die means, comprising: a cemented hard metal carbide cylindrical body having opposite ends with one end adapted for connection to a reciprocal force transmitting source and a second end having a recess; an internally threaded ring means fitting into said recess and forming an interference fit with said recess for solid and firm engagement of the ring means; a cylindrical end cap formed of a cemented hard metal carbide material and having a first face portion for engagement with the material to be extruded, a second face portion for abutting engagement with the opposed end of said cemented hard metal carbide cylindrical body, a reduced diameter extension tapering outwardly toward the outer end thereof and extending axially from said second face portion; and a metal ring having external threads thereon and an inside diameter which tapers outwardly in conformity with the taper on said extension; said metal ring on said extension threadedly engaging said ring means in said recess thereby holding said end cap firmly in concentric and abutting engagement with said cemented hard metal carbide cylindrical body.

2. An extrusion or forming punch according to claim 1 in which said metal ring and said reduced diameter extension taper outwardly at an angle of 5 to 7½ degrees in a direction away from said second face portion, said metal ring being segmented and brazed to said reduced diameter portion.

3. An extrusion or forming punch according to claim 1 in which said metal ring and said reduced diameter extension taper outwardly at an angle of substantially 0 degrees, 30 minutes in a direction away from said second face portion, said metal ring forming an interference fit with said reduced diameter extension.

* * * * *